Nov. 28, 1944. J. B. WELCH 2,363,714
DEVICE FOR CONTROL OF CURRENT IMPULSES
Filed March 1, 1943
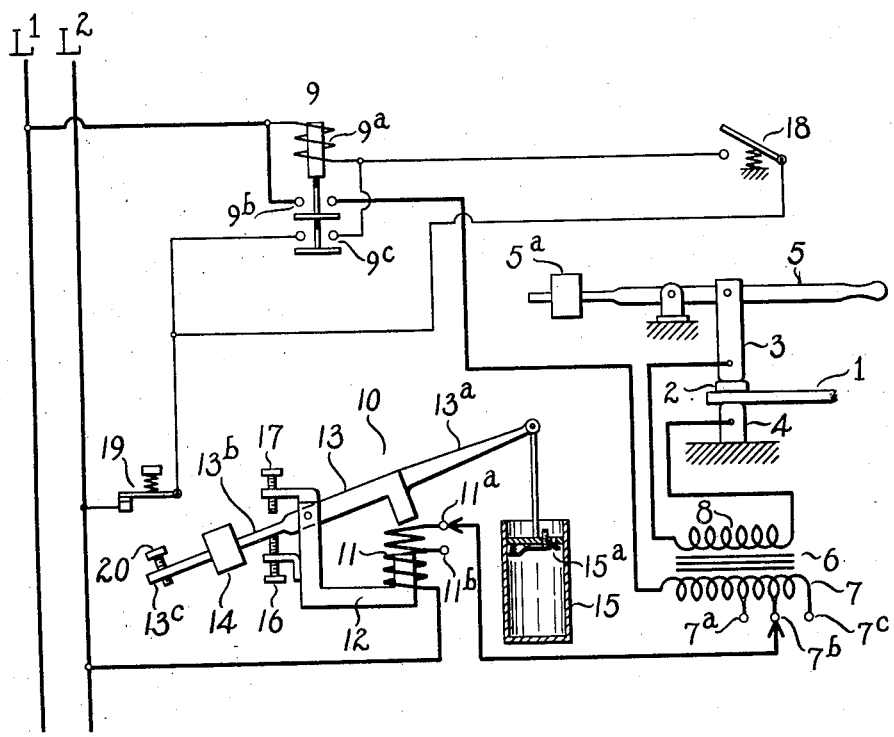
Inventor
Jerome B. Welch
By Frank H. Hubbard
Attorney Patented Nov. 28, 1944

2,363,714

UNITED STATES PATENT OFFICE 2,363,714

DEVICE FOR CONTROL OF CURRENT IMPULSES

Jerome B. Welch, Milwaukee, Wis., assignor to Cutler-Hammer, Inc., Milwaukee, Wis., a corporation of Delaware Application March 1, 1943, Serial No. 477,567

1 Claim. (Cl. 219—4)

This invention relates to a device for control of current impulses. The invention relates more particularly to a brazing controller, and is especially adapted to the control of the current impulses supplied to a machine for joining parts by brazing or soldering.

To braze two parts together they are placed between two relatively movable jaws of a press so that the contacting surfaces which are to be united are in line with the jaws and pressure is applied to the jaws and through them to the contacting surfaces. A quantity of a special brazing metal and flux may be interposed between the surfaces which are to be joined.

The jaws or electrodes are connected into a current supply circuit. Thereupon current is supplied to the circuit. The current in passing through the contacting surfaces heats the surrounding metal to melting temperature and the spots weld together while pressure thereon is continued.

If the current is supplied for too long a time, too much metal is melted and flows away from the spots or the metal is burned, resulting in a defective joint or weld. It is therefore important that the total amount of energy during a brazing cycle be accurately measured and controlled. It is further desirable that the initial current flow be at a relatively high rate, so as to rapidly heat the brazing metal to its melting temperature, and that thereafter the current be decreased to a relatively low value which nevertheless keeps the brazing metal and the pieces to be joined at a predetermined heat until the process is completed.

An object of the present invention is to provide automatic means to afford an initial high brazing current which is thereafter reduced to a desired minimum value.

Another object is to provide adjustable means for regulating the time or duration of flow of brazing current.

Another object is to provide adjustable means for automatically controlling the minimum and maximum current values during a brazing cycle.

Another object is to provide novel means for adjusting or controlling the period of supply of brazing current to a brazing machine and for controlling the rate of change of the brazing current from said maximum to said minimum value.

Other objects and advantages of the invention will hereinafter appear.

The accompanying drawing illustrates a preferred embodiment of the invention.

In the drawing, L¹ and L² designate the terminals of an alternating current supply of brazing energy. The drawing shows a piece of sheet metal 1 to which a relatively small silver button or contact 2 is to be brazed. The two pieces are brought into register and are clamped between the jaws 3 and 4 of a press, which may be operated manually as shown or in any other desired manner. One of the jaws 4 is stationary and is mounted upon the anvil of the press, while the jaw 3 is movable and as shown may be moved toward the jaw 4 by means of a lever 5, which lever is provided with a counterweight 5ª or other biasing means to normally bias the jaw 3 to its retracted position. The welding energy is supplied to the jaws 3 and 4 through a transformer 6 provided with a primary winding 7, equipped with a number of taps 7ª, 7ᵇ, 7ᶜ to which the circuit may be connected selectively in a known manner to provide for varying ratios of transformation of the transformer. The transformer 6 is provided with a secondary winding 8, the terminals of which are connected to the jaws 3 and 4, respectively, so that when two pieces which are to be brazed are clamped between the jaws, the secondary circuit is closed and current passes therethrough in a well known manner upon completion of the circuit of primary winding 7.

To control continuity of the current supply from the lines L¹ and L², the fixed terminal of the primary winding 7 is adapted to be connected to line L¹ through normally open main contacts 9ᵇ of an electromagnetic control switch 9, which is also provided with an energizing winding 9ª and with normally open auxiliary contacts 9ᶜ. Connected in series with a selected tap (such as 7ᵇ illustrated) of the primary winding 7 is the energizing winding 11 of a variable reactance regulator 10. The winding 11 may also be provided with a number of taps 11ª, 11ᵇ which permit variation of the number of active turns of said winding.

The winding 11 is mounted upon a stationary substantially U-shaped magnetic frame 12. Pivotally connected to said frame 12 is an armature 13, so shaped that in the extreme position illustrated a substantial air gap is provided in the ferro-magnetic circuit formed by said frame and armature, whereas in the other extreme position of armature 13 said ferro-magnetic circuit is substantially closed.

The armature 13 is normally biased to the illustrated position of maximum air gap by means of a counterweight 14 mounted on a rearward extension 13ᵇ of said armature, while the clockwise movement of the armature 13 toward its other extreme position, under the influence of the pull exerted thereon by the magnetic flux induced by the coil 11, is opposed by a timing device such as a dash-pot 15, the plunger of which is connected to a forward extension 13a of the armature 13. The dash-pot 15 is provided with an adjustable valve 15a which permits adjustment of the rate of descent of the piston, so that the rate of clockwise movement of armature 13 for controlling time of closure of the magnetic air gap may be regulated. The upward or counterclockwise movement of the armature 13 is not subjected to any substantial retarding action by the dash-pot 15. Any other suitable timing device which is adapted to regulate the movement of the armature in the manner described may be substituted for the dash-pot 15.

The maximum air gap position to which the armature 13 is biased by weight 14 may be preselected or controlled by an adjusting screw 16, which abuts said rearward extension 13b of said armature, while the minimum air gap may similarly be preselected or controlled by an adjusting screw 17.

The system also preferably includes a normally open foot-operated switch 18, which is adapted when closed to connect one terminal of the energizing winding 9a of switch 9 to line L², through a normally closed switch 19; the other terminal of winding 9a being connected directly to line L¹. The auxiliary normally open contacts 9c of switch 9 when closed provide a maintaining circuit for winding 9a independent of switch 18. An adjustable abutment 20 upon a further rearward extension 13c of armature 13 is adapted to effect opening of switch 19 when the armature 13 is moved clockwise to its attracted position.

The operation of the device is as follows: If it is desired to joint two pieces, connection is made to a suitable tap 7a, 7b or 7c on the primary winding 7 and to a suitable tap 11a or 11b on the energizing winding 11. The maximum air gap of the variable reactance regulator 10 is adapted to be adjusted by means of the screw 16; the minimum air gap is adjusted or preselected by the screw 17, and the relative time at which switch 19 is opened is preselected by adjustment of the abutment 20. Thereafter the time of closure of the magnetic circuit of said regulator 10 is preselected or controlled by adjustment of the valve 15a of the dash-pot 15. It will, of course, be understood that under certain conditions or in certain installations some of the aforementioned adjustments will not be required and the means affording the same may be omitted.

After certain or all of the aforedescribed adjustments have been made the operator places the two pieces to be brazed between the jaws 3 and 4 with an interposed layer of brazing metal or flux, if desired, and after applying the desired or required degree of pressure to the jaw 3, he momentarily depresses the foot switch 18. This completes an energizing circuit from line L¹, through winding 9a, and switches 18 and 19 to line L². This causes closure of the main contacts 9b of switch 9, whereupon the maximum current for which the system has previously been adjusted flows through the primary winding 7, and induces a current in the secondary winding 8 of the transformer 6. At the same time auxiliary contact 9c provide a maintaining circuit for winding 9a and the operator may therefore release the foot switch 18. The metal at the opposing surfaces which are to be joined is quickly melted and fills the space between said surfaces.

As soon as the primary transformer current flows, the magnetic flux induced in the frame 12 by the energizing coil 11 attracts the armature 13 and causes it to move downwardly thereby decreasing the air gap which increases the impedance of the regulator 10. The regulator 10, being in series with the primary winding 7 of the transformer 6, decreases the current flowing through the latter and thus decreases the secondary current of the transformer until the armature 13 has descended to its lowermost preselected or adjusted position, in which position of said armature the brazing current will have been reduced to the desired minimum, whereupon the switch 19 is opened. This deenergizes the magnet switch 9 and current is cut off from the transformer 6. The minimum current is preferably chosen so that, even with the welding current still flowing, the jaws 3 and 4 may be separated while the secondary winding is still energized without causing any arc to be formed between the movable jaw 3 and the completed article from which it is separated. This is particularly desirable if the switch 19 is omitted. It should also be pointed out that the jaws 3 and 4 are preferably not separated from each other until the metal which has been melted by the maximum current has again solidified through sufficient reduction of the current, so that the parts being brazed adhere strongly to each other.

While the system has been explained in connection with a brazing or soldering process it will be obvious that it may also be used for electric spot-welding. In the latter case it is often desirable at first to supply a relatively small current to the surfaces to be welded and to increase this current when the metal at the weld softens and thus the contact surfaces between the parts to be welded is increased, which requires a higher current to maintain the material at the weld at welding temperature. Such regulation can be obtained by suitable modifications of the regulator shown, as will be apparent to those skilled in the art.

The invention has been explained in connection with a variable reactance regulator 10 having a correspondingly variable inductance. It is obvious that a regulator having a variable capacitance arranged to vary the current supply through a condenser may be substituted therefor.

In the system shown in the drawing current is supplied from a constant voltage source of alternating current. It is also obvious that the current to the machine may be supplied from a constant current source of alternating current and that a part of the constant current may be shunted around the machine or the transformer supplying the same by a shunt connected variable reactance such as the variable inductor shown in the drawing or by a variable condenser. Further modifications of the device herein specifically illustrated will be obvious to those skilled in the art in the light of the foregoing description.

I claim:

In a current impulse controlling device, a transformer having a primary winding and a secondary winding, electrodes connected with the respective terminals of said secondary winding and adapted for completion of the circuit of the latter upon pressure engagement of said electrodes with work interposed therebetween, a variable reactance regulator including an energizing winding connected in series with said primary winding, said regulator having a magnetic circuit associated with said energizing winding, means for initially providing a predetermined maximum air gap in said magnetic circuit to afford upon completion of the circuits of said primary and secondary windings supply of a predetermined maximum value of current thereto, said energizing winding thereafter acting upon said last mentioned means to reduce said air gap to a predetermined minimum value at a rate of change varying with the magnitude of said current to reduce the current supplied to said primary and secondary windings to a corresponding minimum value, adjustable means associated with said last mentioned means to control the effect of said energizing winding upon the rate of reduction of said air gap from its maximum to its minimum value, said regulator acting automatically after a predetermined period of time to effect interruption of the circuit of said primary winding, and associated means adjustable at will to vary the length of said time period.

JEROME B. WELCH.